United States Patent
Berle et al.

[15] 3,731,707
[45] May 8, 1973

[54] CONTROL VALVE FOR ELASTIC PRESSURE FLUID

[75] Inventors: Axel Gunnar Berle, Antwerpen; Lars Gunnar Nilsson, Hans Kristoffer Olofsson, both of Wilrijk, all of Belgium

[73] Assignee: Atlas Copco Aktiebolag, Nacka, Sweden

[22] Filed: July 7, 1970

[21] Appl. No.: 52,868

[52] U.S. Cl. .................. 137/625.66, 251/75
[51] Int. Cl. .................................. F16k 11/02
[58] Field of Search ....... 137/625.66, 625.26, 625.27, 137/625.61, 625; 251/75

[56] References Cited

UNITED STATES PATENTS

| 3,601,151 | 8/1971 | Brown | 137/625.66 |
| 3,557,836 | 1/1971 | Kutz | 137/625.66 |
| 2,712,427 | 7/1955 | Welborn et al. | 251/75 X |
| 2,288,642 | 7/1942 | Powell | 251/75 X |
| 2,306,029 | 12/1942 | Salzer | 251/75 X |
| 3,542,289 | 11/1970 | Ojala | 137/625.66 |
| 3,559,945 | 2/1971 | Coiner | 251/75 X |

Primary Examiner—M. Cary Nelson
Assistant Examiner—Robert J. Miller
Attorney—Munson and Fiddler

[57] ABSTRACT

A control valve for elastic pressure fluid comprises a housing with inlet and outlet passages in which a valve member is movable from a first position in which pressure fluid is vented from one outlet passage to a second position in which pressure fluid is supplied to said outlet passage. A diaphragm formed as a cup shaped resilient disc divides the housing in two chambers, one of which being constantly vented to the atmosphere and the other being supplied with pressure fluid of varying pressure, the value of which causes the resilient disc to flex from a position in which the valve member is unaffected by the diaphragm to a position in which the valve member is moved from the one position to the other position.

5 Claims, 1 Drawing Figure

Patented May 8, 1973
3,731,707
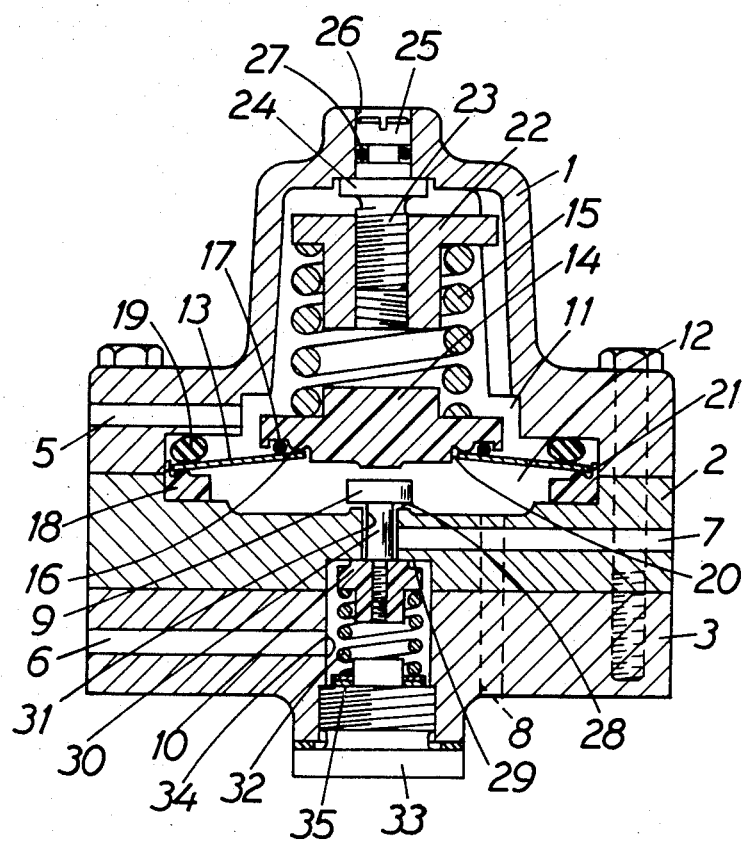
AXEL GUNNAR BERLE,
LARS GUNNAR NILSSON and
HANS KRISTOFFER OLOFSSON
INVENTORS
BY MUNSON & FIDDLER,
Attorneys.

CONTROL VALVE FOR ELASTIC PRESSURE FLUID

This invention relates to control valves for elastic pressure fluid comprising a housing, inlet and outlet passages in said housing, a valve member in the housing which valve member is movable from a first position, in which pressure fluid is vented from one of said outlet passages to a second position, in which pressure fluid is supplied to said one outlet passage. Control valves of this type are frequently used as unloading valves for motor compressor units and other compressors and for controlling compressed air for extinguishing electric arcs in electric switches and for other purposes. The conventional valves are complicated and often unreliable in operation and expensive and one object of the invention is to avoid these disadvantages. The control valve according to the invention comprises a housing forming a first and a second chamber separated by a diaphragm comprising a cup shaped resilient disc, which in a first deflected position makes equilibrium against a fluid pressure in said first chamber and a force independent of said fluid pressure, and which upon increase of said fluid pressure over a predetermined value is deflected and snaps over to a second opposite position in which said diaphragm moves said valve member to said second position, in which pressure fluid is supplied to said one outlet passage. Other features of the invention will be evident from the following specification and the appended claims.

On the enclosed drawing one embodiment of a control valve according to the invention is illustrated by way of example, the FIGURE being an axial section through said control valve.

The illustrated control valve comprises a housing which consists of three parts, an upper part 1, an intermediate part 2, and a lower part 3, preferably bolted together. The illustrated control valve is intended to be used as an unloading valve in a motor compressor unit. The upper part 1 of the housing forms an inlet passage 5 which, when the valve is used as above indicated, is supplied with pressure fluid from the compressor receiver or other part of the compressed fluid network at the discharge side of the compressor. The pressure supplied to the passage 5 may preferably be a reduced delivery pressure or may stand in certain relation to pressure changes in a compressed fluid network which is fed by the compressor. The housing 1 – 3 is further provided with an inlet passage 6 in the lower part 3 of the housing which inlet passage may be supplied with pressure fluid for operation of an unloading mechanism of the compressor, and for this purpose said passage may preferably be connected to the delivery end of the compressor or to a receiver fed by the compressor. In the intermediate part 2 of the housing an outlet passage 7 is formed which may be connected to and communicates with an unloading mechanism of the compressor. The valve housing is, furthermore, provided with a vent passage 8 which may communicate with the atmosphere. The pressure fluid which is supplied to the inlet passages 5 and 6 may naturally be another pressure fluid than compressed air from an air compressor receiver in cases where the control valve device is used for other purposes than as an air compressor unloading valve.

The upper part 1 and the intermediate part 2 of the housing form a first chamber 11 and a second chamber 12. The pressure fluid supply from the inlet passage 6 to the outlet passage 7 is controlled by the double valve member 9, 10 which is disposed in the intermediate part 2 of the housing. The first chamber 11 communicates with the inlet passage 5 and the second chamber 12 continuously communicates with the atmosphere through an outlet passage 8. The chambers 11 and 12 are separated by a diaphragm comprising a cup shaped resilient disc 13 which in the illustrated embodiment consists of an annular frusto-conical metal spring disc, the central portion of which is sealed against a spring retainer 14 which in the figure is pressed downwards by a helical spring 15. The annular disc 13 rests on a seat 16 at the lower face of the spring retainer 14 and a sealing ring 17, such as an O-ring, is provided between the inner annular portion of the disc and the spring retainer. The outer portion of the disc 13 rests on a ring 18 which forms a seat for the outer portion of the disc, and a sealing ring 19, such as an O-ring, is provided at the upper side of the outer portion of the disc between said portion and the upper part 1 of the housing. The seat 16 is formed in such a way that the outer edge of the disc 13 is free to move radially inwards due to the provision of a space or clearance 20 and similarly the seat 18 is carried out in such a way that the peripheral outer edge of the disc 13 is free to move radially outwards due to the provision of a clearance 21. The spring retainer 14, the seat forming ring 18, and the valve member 10 may preferably be carried out by a resinous material, for instance a material sold under the trade mark DELRIN.

The helical spring 15 is inserted between the spring retainer 14 and a screw threaded spring retainer 22 which is engaged by a set screw 23. The set screw 23 has a flange 24 which bears on a counter bore in the upper part 1 of the housing and the set screw is accessible for adjustments through a bore 26 in the upper part 1 of the housing in which bore the screw head 25 is accessible from the outside of the housing. An O-ring 27 forms a seal between the set screw 23 and the upper part 1 of the housing. By means of the set screw 23 the tension of the spring 15 may be adjusted and since the spring 15 and the fluid pressure in the first chamber 11 act against the spring force produced by the annular disc 13 said adjustment of the spring 15 defines the fluid pressure in the inlet passage 5 at which the annular spring disc 13 is deflected to its lower position.

The valve members 9, 10 cooperate with seats 28, 29 on the intermediate part 2 of the housing and the valve members 9, 10 are connected one with the other by means of a spindle 30 which with certain clearance extends through a bore 31 in the intermediate part 2. The bore 31 communicates with the outlet passage 7. A helical spring 32 is provided between the valve member 10 and a plug 33 which is screwed into a threaded portion of a bore 34 provided in the lower part of the housing and in the intermediate part 2. The bore 34 communicates with the inlet passage 6. In the bore 34 the valve member 10 and spring 32 and a number of shims 35 for adjustment of the spring tension are disposed. The tension of the spring 32 defines the difference in pressure between the reloading and unloading pressure of a compressor and may be adjusted by suitable choice of the number and thickness of the shims 35 between the spring 32 and the plug 33.

The control valve device above described and used as unloading valve operates in the following manner:-

The inlet passage 5 normally communicates with a pressure fluid source, for instance the receiver of an air compressor, so that air pressure corresponding to the receiver pressure or to a change in the receiver pressure prevails in the first chamber 11. The inlet passage 6 is preferably in communication with the receiver of the compressor or another part of a compressed air network for the supply of operating air. The outlet passage 8 forms a constant communication between the second chamber 12 and the atmosphere so that the second chamber 12 is always vented. The outlet passage 7 preferably communicates with an unloading mechanism for the compressor which may operate so that when operating air is supplied through the outlet passage 7 the compressor is unloaded. The annular resilient disc 13 has such spring characteristic that the spring force at first rises when the disc is pressed downwards from the illustrated position, said spring force increasing to a certain maximum and then decreases when the spring disc is flattened. The spring force of the disc then decreases still further but is still directed upwards also when the spring disc has snapped down so that it is deflected downwards in the figure. The spring force decreases however continuously within the control range of the device from the above mentioned maximum value. In the figure the control valve according to the invention is illustrated in the position which it takes when the compressor is in operation and loaded. If the pressure on the delivery side of the compressor, i.e. in the receiver, rises then the pressure in the inlet passage 5 will also rise and consequently also the pressure in the first chamber 11 and this pressure together with the force of the spring 15 presses the resilient disc 13 downwards in the figure so that said disc is gradually flattened. When the pressure in the inlet passage 5 and the chamber 11 increases to a certain value then the upwards directed spring force of the disc 13 first increases to a maximum. As mentioned hereinabove the upwards directed force of the resilient disc then decreases as the disc is flattened and if the pressure in the chamber 11 rises further then the disc 13 is quickly swung down by said force so that the disc 13 is deflected downwards in the figure. The spring retainer 14 then abuts the valve member 9 and forces said member towards the seat 28 against the action of the spring 32. The valve member 10 is then lifted from its seat and operating air from the inlet passage 6 flows through the bore 34 and the bore 31 to the outlet passage 7 and further to the unloading mechanism of the compressor, so that the compressor is unloaded, for instance by the inlet valves being kept open by the unloading mechanism.

The compressor remains unloaded as long as the pressure in the first chamber 11 and the force of the helical spring 15 is greater than the upward spring force of the resilient disc 13 plus the force of the spring 32 which through the valve member 9 acts on the spring retainer 14. During this interval the compressor runs unloaded. When the pressure on the discharge side of the compressor or in the receiver, respectively, again decreases to a certain other value than the unloading value then the force of the spring disc 13 and the force of the spring 32 will move the spring retainer 14 upwards in the figure and due to the spring characteristic of the resilient disc 13 the spring retainer and diaphragm snaps up to the position illustrated in the figure in which the resilient disc 13 is deflected upwards. Simultaneously, the valve member 10 closes the communication between the inlet passage 6 and the outlet passage 7 and the valve member 9 opens the communication between the outlet passage 7 and the chamber 12 and the vent passage 8 so that the unloading mechanism of the compressor is vented and the compressor is reloaded. By changing the pre-tension of the spring 32, i.e. by changing the number of shims 35, the reloading pressure of the compressor i.e. the difference between reloading and unloading pressure is changed.

The embodiment of the invention above described and illustrated on the drawing should only be considered as an example and may be modified in various different ways within the scope of the claims. The control valve device according to the invention may, for instance, be utilized to operate on other pressure fluids than compressed air delivered by the compressors for operation of the unloading mechanism or other mechanisms and it may also be used for other purposes than above described.

We claim:

1. A control valve for elastic pressure fluid comprising, a housing, inlet passages and outlet passages in said housing, a valve member in the housing which valve member is movable from a first position, in which pressure fluid is vented from one of said outlet passages to a second position in which pressure fluid is supplied to said one outlet passage, said housing forming a first and a second chamber separated by a diaphragm consisting of a cup-shaped resilient disc which in a first deflected position makes equilibrium against a fluid pressure in said first chamber and a force independent of said fluid pressure, and which upon increase of said fluid pressure over a predetermined value is deflected and snaps over to a second opposite position in which said diaphragm moves said valve member to said second position, said resilient disc comprising a spring characteristic curve which when deflected away from said first deflected position towards said second opposite position has a maximum spring force and a reduced spring force when the disc is in snap-over position, and a still more reduced spring force when the disc is deflected further towards said second opposite position, said spring force being directed in the same direction.

2. A control valve according to claim 1 in which the cup shaped resilient disc is an annular frusto-conical spring disc, and in which a spring retainer is provided which forms a seat for the inner border of said annular disc and is sealed against the disc, which is furthermore sealed against the housing at the outer border.

3. A control valve according to claim 2, in which an adjustable helical spring is provided in the housing and presses said spring retainer in the same direction as the fluid pressure on the diaphragm.

4. A control valve according to claim 2, in which the outer and inner edges or borders of the resilient annular disc are mounted in the housing so that they are free to move radially.

5. A control valve according to claim 1, in which the valve member is movable from said first position to said second position against the force of a spring, the tension of which is adjustable by means of one or more shims.

* * * * *